United States Patent
Nagao et al.

(10) Patent No.: US 11,613,662 B2
(45) Date of Patent: Mar. 28, 2023

(54) AQUEOUS INK, INK CARTRIDGE AND INK JET RECORDING METHOD

(71) Applicant: CANON KABUSHIKI KAISHA, Tokyo (JP)

(72) Inventors: Ryosuke Nagao, Kanagawa (JP); Kenta Ohtsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 17/171,004

(22) Filed: Feb. 9, 2021

(65) Prior Publication Data
US 2021/0253884 A1   Aug. 19, 2021

(30) Foreign Application Priority Data

Feb. 13, 2020   (JP) .............................. JP2020-021971
Jan. 15, 2021   (JP) .............................. JP2021-005006

(51) Int. Cl.
*C09D 11/107*   (2014.01)
*B41J 2/175*   (2006.01)
(Continued)

(52) U.S. Cl.
CPC ......... *C09D 11/107* (2013.01); *B41J 2/17503* (2013.01); *B41M 5/0023* (2013.01); *C09D 11/322* (2013.01)

(58) Field of Classification Search
CPC ..... C08F 220/06; C09D 11/322; C09D 11/40; C09D 11/03; B41J 2/2107
See application file for complete search history.

(56) References Cited

U.S. PATENT DOCUMENTS 7,241,332 B2 * 7/2007 Yoshizawa ............ C09D 11/32
                                                                    106/31.47
7,250,479 B2    7/2007 Le et al.
                        (Continued)

FOREIGN PATENT DOCUMENTS

EP   2330154 A1   6/2011
EP   2990441 A1   3/2016
              (Continued)

OTHER PUBLICATIONS

European Search Report issued in corresponding European Application No. 21156365.5 dated Jul. 16, 2021.

*Primary Examiner* — John Zimmermann
(74) *Attorney, Agent, or Firm* — Venable LLP

(57) ABSTRACT

Provided is an aqueous ink for ink jet that has excellent storage stability and whose viscosity does not easily increase even in a case where the ink is stored in a severe environment such as a high temperature condition. This aqueous ink for ink jet contains a coloring material and a block copolymer. The block copolymer includes an A block having a segment A having no acid group and a group represented by Formula (1) bonded to one terminal of the segment A, and a B block having a segment B having an acid group and a group represented by Formula (2) bonded to one terminal of the segment B.

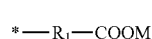

(1)

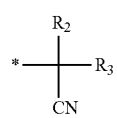

(2)

(In Formula (1), $R_1$ represents an alkylene group, and M represents a hydrogen atom, an alkali metal, ammonium or
(Continued)

organic ammonium. In Formula (2), $R_2$ and $R_3$ each independently represent an alkyl group or the like.)

21 Claims, 2 Drawing Sheets

(51) Int. Cl.
 *B41M 5/00* (2006.01)
 *C09D 11/322* (2014.01)

(56) References Cited

U.S. PATENT DOCUMENTS

| | | | |
|---|---|---|---|
| 7,662,986 B2 | 2/2010 | Le et al. | |
| 7,666,962 B2 | 2/2010 | Le et al. | |
| 7,714,075 B1 | 5/2010 | Le et al. | |
| 8,343,269 B2 | 1/2013 | Takahashi et al. | |
| 8,641,182 B2 | 2/2014 | Nishiguchi et al. | |
| 8,814,341 B2 | 8/2014 | Nagao et al. | |
| 9,850,391 B2 * | 12/2017 | Fukuoka | C09D 11/326 |
| 11,447,650 B2 * | 9/2022 | Toeda | C09D 11/40 |
| 2002/0075369 A1 * | 6/2002 | Ota | C09D 11/322 347/100 |
| 2003/0109600 A1 * | 6/2003 | Shirota | C09D 11/322 523/160 |
| 2004/0171777 A1 | 9/2004 | Le et al. | |
| 2008/0139764 A1 | 6/2008 | Le et al. | |
| 2008/0139836 A1 | 6/2008 | Le et al. | |
| 2010/0143589 A1 * | 6/2010 | Spinelli | C08G 18/12 427/256 |
| 2012/0050384 A1 | 3/2012 | Nishiguchi et al. | |
| 2014/0141209 A1 * | 5/2014 | Koizuka | C09D 11/324 524/88 |
| 2020/0199387 A1 | 6/2020 | Utsugi et al. | |

FOREIGN PATENT DOCUMENTS

| | | |
|---|---|---|
| JP | 2000-515181 A | 11/2000 |
| JP | 2008-195769 A | 8/2008 |
| JP | 2012-072357 A | 4/2012 |
| JP | 2018-203802 A | 12/2018 |
| WO | 98/01478 A1 | 1/1998 |

\* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

The frequency of use of ink jet recording apparatuses has been increasing in the business field with an improvement in image quality and an increase in recording speed. The inks for ink jet used in the business field are required not only to be able to record an image having excellent fastness, but also to have properties such as superior reliability such as storage stability than ever before. Inks to which pigments and block copolymers are added have been investigated in order to improve these performances.

For example, an ink for ink jet containing a block copolymer having a hydrophobic segment and a hydrophilic segment in which a hydrophobic unit and a hydrophilic unit form a random or gradient copolymer structure is proposed. (Japanese Patent Application Laid-Open No. 2008-195769). In addition, an ink for ink jet containing an ABC triblock copolymer is proposed (Japanese Patent Application Laid-Open No. 2012-072357).

As a method for producing a block copolymer, a living radical polymerization method is frequently studied from the viewpoint of compatibility with a wide variety of (meth) acrylic acid esters used as monomers. For example, so-called reversible addition-fragmentation chain transfer polymerization (RAFT polymerization) using a dithioester or trithiocarbonate chain transfer agent is proposed (Japanese Patent Application Laid-Open No. 2000-515181). Further, an ink for ink jet containing an AB block copolymer synthesized by RAFT polymerization is proposed (Japanese Patent Application Laid-Open No. 2018-203802).

SUMMARY OF THE INVENTION

An ink containing a block copolymer has improved reliability such as storage stability to some extent as compared with an ink containing no block copolymer. However, as a result of investigation conducted by the present inventors, it has been found that the inks proposed in Japanese Patent Laid-Open No. 2008-195769 and Japanese Patent Laid-Open No. 2012-072357 does not satisfy a level of reliability required for an ink jet recording apparatus in the business field in recent years.

Accordingly, an object of the present invention is to provide an aqueous ink for ink jet that has excellent storage stability and whose viscosity does not easily increase even in a case where the ink is stored in a severe environment such as a high temperature condition and the like. Another object of the present invention is to provide an ink cartridge and an ink jet recording method using the aqueous ink.

That is, according to an aspect of the present invention, there is provided an aqueous ink for ink jet including a coloring material and a block copolymer, in which the block copolymer includes an A block having a segment A having no acid group, and a group represented by Formula (1) bonded to one terminal of the segment A, and a B block having a segment B having an acid group and a group represented by Formula (2) bonded to one terminal of the segment B.

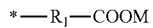
(1)

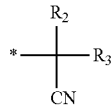
(2)

In Formula (1), * represents a bonding position to one terminal of the segment A, $R_1$ represents an alkylene group, and M represents a hydrogen atom, an alkali metal, ammonium or an organic ammonium. In Formula (2), * represents a bonding position to one terminal of the segment B, $R_2$ and $R_3$ each independently represent a hydrogen atom or an alkyl group, and $R_2$ and $R_3$ may be bonded to each other to form a ring structure.

According to the aspect of the present invention, it is possible to provide an aqueous ink for ink jet that has excellent storage stability and whose viscosity does not easily increase even in a case where the ink is stored in a severe environment such as a high temperature condition and the like. In addition, according to another aspect of the present invention, it is possible to provide an ink cartridge and an ink jet recording method using the aqueous ink.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus and FIG. 2B is a perspective view illustrating a head cartridge.

DESCRIPTION OF THE EMBODIMENTS

Figure 1:
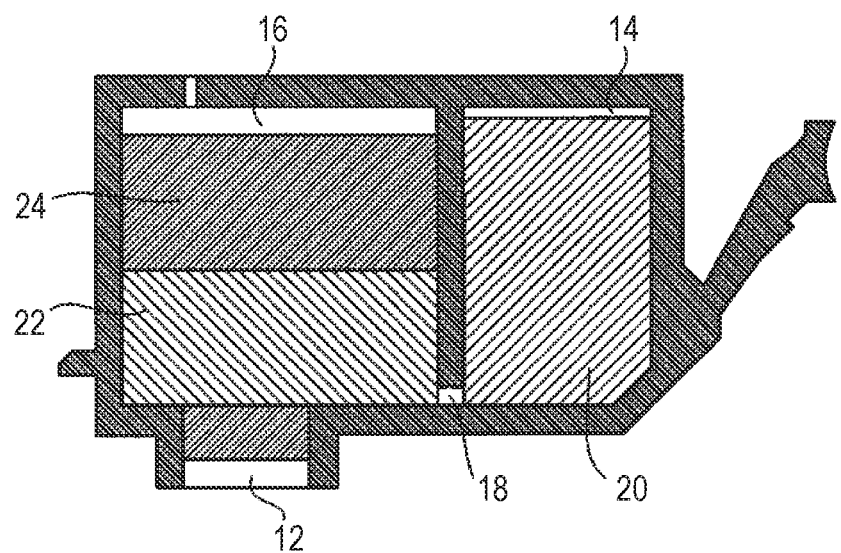
FIG. 1 is a cross-sectional view schematically illustrating an exemplary embodiment of an ink cartridge according to the present invention.

The present invention will be described in more detail below with reference to preferred exemplary embodiments. In the present invention, in a case where the compound is a salt, the salt is present in a state dissociated into ions in an ink, which is, however, expressed as "salt is contained" for convenience according to the present invention. Further, an aqueous ink for ink jet may be simply referred to as "ink" in some cases. The physical property values are values at room temperature (25° C.) unless otherwise specified. In a case where the term "(meth)acrylic acid" is used, the term means "acrylic acid and/or methacrylic acid". The term "unit" of a copolymer means a repeating unit derived from one monomer and the "segment" means a unit including a plurality of "units".

A general block copolymer contains two or more types of polymer blocks having different properties, and these polymer blocks are covalently bonded to each other. A block copolymer used in an aqueous ink for ink jet is used to allow a component having a hydrophobic site, typified by a coloring material such as a dye or a pigment, to be stably present in an aqueous medium. The block copolymer used for such a purpose usually has a block having no acid group (hydrophobic block) and a block having an acid group (hydrophilic block). Then, the hydrophobic block is adsorbed onto the hydrophobic site of the component, and a steric repulsion force generated by the hydrophilic block exerts an action of keeping the presence state of the component stable in the aqueous medium.

On the other hand, when the length of the hydrophobic block is increased in order to improve the adsorptivity to the hydrophobic site, the intermolecular association is enhanced by the hydrophobic interaction between the hydrophobic blocks. When the intermolecular association is enhanced, the movement of the molecular chains is suppressed and the adsorptivity to the component is rather lowered. Thus, the storage stability of the ink is easily lowered. Further, the hydrophilic block is also self-associated due to a hydrogen bond in the molecule, and the steric repulsion force is easily decreased.

The present inventors have investigated the suppression of intermolecular association of a hydrophobic block and the intermolecular association of a hydrophilic block by bonding a group having a specific structure to the terminal of each block of a so-called A-B block copolymer including a hydrophobic block and a hydrophilic block. As a result, a block copolymer in which a specific group is bonded to the terminal of each of a segment A having no acid group and a segment B having an acid group has been found. By forming an A block in which a group represented by Formula (1) is bonded to one terminal of the segment A having no acid group, the terminal of the A block is negatively charged in an aqueous medium. Thus, it has been found that since the carboxylic acid group in Formula (1) pulls the molecular chain to be extended, the hydrophobic interaction is suppressed. In addition, the terminal of the B block is also negatively polarized in the aqueous medium by the electron withdrawing of the cyano group in Formula (2) by forming a B block in which a group represented by Formula (2) is bonded to one terminal of a segment B having an acid group. As a result, it has been found that self-association due to a hydrogen bond in the molecule is suppressed by pulling and extending the molecular chain.

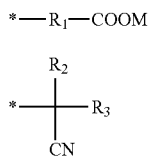

In Formula (1), * represents a bonding position to one terminal of the segment A, $R_1$ represents an alkylene group, and M represents a hydrogen atom, an alkali metal, ammonium or an organic ammonium. In Formula (2), * represents a bonding position to one terminal of the segment B, and $R_2$ and $R_3$ each independently represent a hydrogen atom or an alkyl group. $R_2$ and $R_3$ may be bonded to each other to form a ring structure.

It has been found that by incorporating the block copolymer containing the A block and the B block into the aqueous ink, even in a case where the ink is stored even in a severe environment such as a high temperature condition and the like, the viscosity of the ink is not easily increased and the storage stability is improved. It is considered that by hydrogen bonding between the acid group in the B block whose self-association is suppressed by the cyano group in Formula (2) and the carboxylic acid group in Formula (1), the steric repulsion force between the block copolymers is improved and the storage stability of the ink is improved.

<Ink>

An ink according to the present invention is an aqueous ink for ink jet containing a block copolymer. The block copolymer includes an A block which is a hydrophobic block and a B block which is a hydrophilic block. The A block is a polymer block including a segment A having no acid group and a group represented by Formula (1) bonded to one terminal of the segment A. The B block is a polymer block including a segment B having an acid group and a group represented by Formula (2) bonded to one terminal of the segment B. Hereinafter, the components constituting the ink of the present invention and physical properties of the ink will be described in detail.

In Formula (1), * represents a bonding position to one terminal of the segment A, $R_1$ represents an alkylene group, and M represents a hydrogen atom, an alkali metal, ammonium or an organic ammonium. In Formula (2), * represents a bonding position to one terminal of the segment B and $R_2$ and $R_3$ each independently represent a hydrogen atom or an alkyl group. $R_2$ and $R_3$ may be bonded to each other to form a ring structure.

(Block Copolymer)

The block copolymer includes an A block which is a hydrophobic block and a B block which is a hydrophilic block. The content (% by mass) of the block copolymer in the ink is preferably 0.1% by mass or more to 5.0% by mass or less and more preferably 0.5% by mass or more to 2.0% by mass or less based on the total mass of the ink. The block copolymer may be present in the ink in a dissolved state or may be present in the ink in a dispersed state. Of these, it is preferable that the block copolymer is present in the ink in a dispersed state, that is, is present in the ink in the form of micelle. The presence state of the block copolymer in the ink can be controlled by adjusting the balance of the hydrophobicity, and specifically, by adjusting the types and ratios of the units constituting each block, the number average molecular weight and ratios of each block and the like.

The A block is a hydrophobic block in which a group represented by Formula (1) is bonded to one terminal of the segment A having no acid group. The B block is a hydrophilic block in which a group represented by Formula (2) is bonded to one terminal of the segment B having an acid group. Both the segment A and the segment B can be formed of a known monomer. Both the segment A and the segment B may be homopolymers formed only of a unit derived from a single monomer or may be copolymers containing units derived from a plurality of monomers.

A plurality of the segment As and a plurality of the segment Bs may be included in the A block and the B block, respectively. Specifically, the block copolymer may be a so-called A-B block copolymer including only one A block and one B block. In addition, the block copolymer may be a block copolymer including an A block including two segment As and a B block including one segment B. Further, the block copolymer may be a block copolymer including an A block including one segment A and a B block including two segment Bs. Of course, the constitution of each block is not limited thereto.

[A Block]

The A block is a hydrophobic polymer block including a segment A having no acid group and a group represented by Formula (1) bonded to one terminal of the segment A. The segment A can be formed by (co)polymerizing one or more known monomers having no acid group.

As the monomer for forming the segment A, a monomer having an aromatic group such as styrene, vinyl toluene, α-methylstyrene or benzyl (meth)acrylate; methyl (meth)acrylate, ethyl (meth)acrylate, propyl (meth)acrylate, butyl (meth)acrylate and 2-ethylhexyl (meth)acrylate; a (meth)acrylate ester (monomer having an aliphatic group) which may have a substituent such as an amino group, such as cyclohexyl (meth)acrylate, isobornyl (meth)acrylate or dimethylaminoethyl (meth)acrylate; and a (meth)acrylic acid derivative such as (meth)acrylonitrile or (meth)acrylamide can be used. From the viewpoint of enhancing the adsorptivity to a coloring material such as a pigment and further improving the storage stability of the ink, the monomer that becomes the unit forming the segment A by polymerization includes a monomer having an aromatic group such as styrene or benzyl (meth)acrylate.

The group represented by Formula (1) is bonded to one terminal of the segment A.

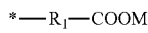
(1)

In Formula (1), * represents a bonding position to one terminal of the segment A. $R_1$ represents an alkylene group. The alkylene group may have a substituent and may be either linear or branched. The alkylene group preferably has 1 to 8 carbon atoms and more preferably has 2 to 6 carbon atoms. Examples of the alkylene group include a methylene group, an ethylene group, an n-propylene group, an iso-propylene group and a hexylene group. Examples of the above-mentioned substituent include a halogen atom such as a fluorine atom, a chlorine atom or a bromine atom; a cyano group; a hydroxy group; and an amino group. Among these, an electron withdrawing group such as a halogen atom or a cyano group is preferable. M represents a hydrogen atom, an alkali metal, ammonium or an organic ammonium.

The group represented by Formula (1) is preferably a group that is easily negatively charged from the viewpoint of more effectively suppressing the self-association of the A block in the molecule. Specifically, the group represented by Formula (1) is preferably represented by Formula (1a) or (1b) and is more preferably represented by Formula (1a) having a cyano group.

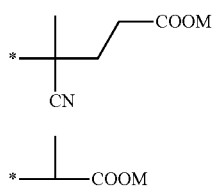

In Formulae (1a) and (1b), * represents a bonding position to one terminal of the segment A, and M represents a hydrogen atom, an alkali metal, ammonium or an organic ammonium.

[B Block]

The B block is a hydrophilic polymer block including a segment B having an acid group and a group represented by Formula (1) bonded to one terminal of the segment B. The segment B can be formed by (co)polymerizing one or more known monomers including a monomer having an acid group. The segment B is preferably a copolymer containing two or more types of units and more preferably a random copolymer.

As the monomer having an acid group, a monomer having a carboxylic acid group is preferable and (meth)acrylic acid is more preferable. As the monomer for constituting the segment B, a monomer having no acid group can be further used. Examples of the monomer having no acid group include the same monomers as those exemplified as the monomer for forming the segment A described above. As the monomer that becomes a unit forming the segment B by polymerization, from the viewpoint of effectively suppressing self-association due to a hydrogen bond in the molecule and further improving the storage stability of the ink, in addition to (meth)acrylic acid, a monomer having no acid group is preferably included. The monomer having no acid group preferably contains a (meth)acrylic acid ester.

The group represented by Formula (2) is bonded to one terminal of the segment B.

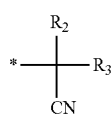
(2)

In Formula (2), * represents a bonding position to one terminal of the segment B. $R_2$ and $R_3$ each independently represent a hydrogen atom or an alkyl group, and $R_2$ and $R_3$ may be bonded to each other to form a ring structure such as a cycloalkyl group. The alkyl group may have a substituent and may be either linear or branched. The alkyl group preferably has 1 to 8 carbon atoms and more preferably 1 to 6 carbon atoms. Examples of the alkyl group include a methyl group, an ethyl group, an n-propyl group, an iso-propyl group, an iso-butyl group and a hexyl group. As the above-mentioned substituent, an acid group such as a carboxylic acid group, a sulfonic acid group or a phosphonic acid group; an alkoxy group having 1 to 4 carbon atoms such as a methoxy group or an ethoxy group; an amino group; and a group obtained by combining at least two of these can be used. Examples of the ring structure formed by bonding $R_2$ and $R_3$ with each other include cycloalkyl groups having about 3 to 8 carbon atoms, such as a cyclopropyl group, a cyclobutyl group and a cyclohexyl group.

The group represented by Formula (2) is preferably represented by any one of Formulae (2a), (2b), (2c), (2d), (2e) and (20 and is more preferably represented by Formula (2a) from the viewpoint of more effectively suppresses the intramolecular association of the B block.

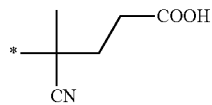
(2a)

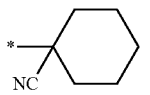
(2b)

(2c)

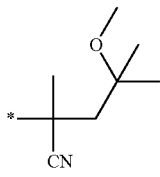
(2d)

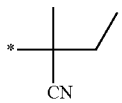
(2e)

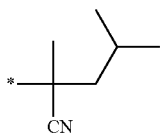
(2f)

In Formulae (2a), (2b), (2c), (2d), (2e) and (20, * represents a bonding position to one terminal of the segment B.

The group represented by Formula (1) bonded to one terminal of the segment A is preferably represented by Formula (1a) and the group represented by Formula (2) bonded to one terminal of the segment B is preferably represented by Formula (20. As a result, the carboxylic acid group present at one terminal of the A block of the block copolymer is easily hydrogen-bonded to the B block, and thus the storage stability can be further improved.

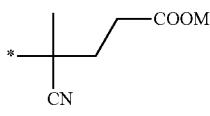
(1a)

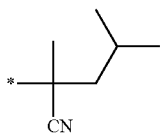
(2f)

In Formula (1a), * represents a bonding position to one terminal of the segment A, and M represents a hydrogen atom, an alkali metal, ammonium or an organic ammonium. In Formula (20, * represents a bonding position to one terminal of the segment B.

[Physical Properties of Block Copolymer]

The acid value of the block copolymer is preferably 50 mgKOH/g or more to 200 mgKOH/g or less and more preferably 100 mgKOH/g or more to 160 mgKOH/g or less. When the acid value of the block copolymer is more than 100 mgKOH/g, the amount of acid groups in one molecule of the block copolymer is excessively small, so that the hydrophilicity may be lowered and the sticking recovery property may be easily reduced. On the other hand, when the acid value of the block copolymer is more than 160 mgKOH/g, the amount of acid groups of the block copolymer as a whole is excessively large, so that the molecules of the block copolymer may easily spread in the ink, the viscosity of the ink may be increased and the sticking recovery property may be easily lowered. When the sticking recovery property is reduced, in a case where the ink sticks to an ejection orifice of a recording head and the ink is not easily ejected normally, many recovery operations required to recover the normal ejection state are required. The acid value of the block copolymer can be measured by neutralization titration using a potential difference.

The number average molecular weight of the block copolymer is preferably 5,000 or more to 20,000 or less. When the number average molecular weight of the block copolymer is less than 5,000, the molecular chain of the block copolymer is short, so that the effect of improving the adsorption force and the steric repulsion force may be weak and the storage stability may be easily lowered. On the other hand, when the number average molecular weight of the block copolymer is more than 20,000, the viscosity of the ink may be increased and the sticking recovery property may be easily decreased. The number average molecular weight (MnA) of the A block is preferably 2,500 or more to 5,000 or less. The number average molecular weight (MnB) of the B block is preferably 2,500 or more to 5,000 or less. The number average molecular weight of the block copolymer and each block is a value in terms of polystyrene measured by gel permeation chromatography (GPC).

The ratio (MnB/MnA (times)) of the number average molecular weight (MnB) of the B block to the number average molecular weight (MnA) of the A block is preferably 0.8 times or more to 1.2 times or less and more preferably 0.9 times or more to 1.1 times or less. When the value (times) of MnB/MnA is excessively large, the adsorption force is easily decreased and the storage stability of the ink may be slightly decreased. On the other hand, when the value (times) of MnB/MnA is excessively small, the steric repulsive force may be easily decreased and the storage stability of the ink may be slightly decreased. The value of MnB/MnA can be calculated from the number average molecular weight (MnA and MnB) of each block constituting the block copolymer. The number average molecular weight of each block can be known by a general method such as a method of measuring the chemical shift corresponding to the repetition of units constituting the block by NMR and calculating the number average molecular weight using a calibration curve prepared in advance. The calibration curve used here can be prepared by using a resin having a known repetition number of units. For example, in the "Resin 1" synthesized in the example described later can be analyzed as follows. In order to know the repetition number of units of benzyl methacrylate in the A block, the chemical shift due to the repetition of the benzene ring is measured. The proportion of A block occupied in the resin is calculated from the repetition number of the benzyl methacrylate by the method described above, and MnA and MnB can be calculated from Mn of the block copolymer obtained by a separate measurement.

[Method for Producing Block Copolymer]

The block copolymer can be produced by various living polymerization methods such as a living radical polymerization method, a living anion polymerization method and a living cationic polymerization method. Among these, it is preferable that the block copolymer is produced by a living radical polymerization method since the method is easily applicable to a general purpose monomer having an aromatic group and a monomer such as (meth)acrylic acid ester in the copolymer contained in the aqueous ink for ink jet. Examples of the living radical polymerization method include NMP method, ATRP method, RAFT method, TERP method, SBRP method, BIRP method, CMRP method and RTCP method. Among these, the RAFT method (reversible addition-fragmentation chain transfer method) is preferable since the method is a simple method in which a RAFT agent, which is a chain transfer agent, is simply added to a normal radical polymerization system using an azo initiator. Further, since the RAFT method does not need to use metal or halogen, the method is preferable from the viewpoint of waste liquid treatment and the like.

In the living radical polymerization method, the polymerization rate of a first block is calculated from the concentration of the residual monomer measured by a dry solid content or gas chromatography, and when the consumption of the monomer is confirmed, a monomer constituting a second block is added to allow the polymerization reaction to proceed. As a result, a diblock copolymer in which the first block and the second block are bonded can be obtained. In addition, by repeating the above operation multiple times, a block copolymer in which blocks including a plurality of segments are bonded and the like can be obtained.

A method for bonding the group represented by Formula (1) to the terminal of the segment A and bonding the group represented by Formula (2) to the terminal of the segment B contained in the block copolymer is not particularly limited. For example, in order to bond a group represented by Formula (1) to the terminal of the segment A, a method of polymerizing a monomer in the presence of a RAFT agent can be employed. As the RAFT agent, a general purpose RAFT agent or the like can be used, and a compound having a structure corresponding to the group represented by Formula (1) may be selected. In this case, a polymerization initiator in an amount necessary to start RAFT polymerization may be used. For example, in order to bond a group represented by Formula (2) to the terminal of the segment B, following the above procedure, another monomer is further polymerized to synthesize a copolymer having a site containing a sulfur atom at the terminal portion. Thereafter, a radical polymerization initiator or the like is reacted with the copolymer as a terminal treatment agent. As the radical polymerization initiator, a general purpose azo compound or the like can be used, and a compound having a structure corresponding to the group represented by Formula (2) may be selected. When the copolymer is polymerized by the RAFT method, the site containing the sulfur atom which is formed at the terminal portion on the reaction point side of the polymerization has activity. Thus, at the terminal on the end point side of the polymerization, the azo-based radical polymerization initiator is efficiently reacted and the group represented by Formula (2) can be introduced. In addition, the structure of both terminal portions of the copolymer is easily set by selecting the RAFT agent.

Since the efficiency of the terminal treatment is easily increased, the reaction conditions at the time of terminal treatment with the terminal treating agent are preferably as follows. The amount of the terminal treating agent used is preferably 2.0 times or more in terms of the molar ratio based on the amount of the RAFT agent used. The molar ratio is preferably 10.0 times or less and more preferably 5.0 times or less. In addition, it is preferable to allow the terminal treating agent to react within 30 minutes after the polymerization of the monomer which is performed in the presence of the RAFT agent is completed. Since the molecular weight distribution of the copolymer can be narrowed, it is preferable to allow the terminal treating agent to react at a temperature 20° C. or more higher than the 10-hour half-life temperature of the terminal treating agent (azo-based radical polymerization initiator). The 10-hour half-life temperature is known as a value in toluene or water which is a general-purpose liquid medium as a polymerization solvent.

(Coloring Material)

The ink according to the present invention contains a coloring material. It is preferable to use a pigment and a dye as the coloring material. The coloring material is preferably a pigment and more preferably a resin-dispersed pigment. The content (% by mass) of the coloring material in the ink is preferably 0.1% by mass or more to 15.0% by mass or less and more preferably 1.0% by mass or more to 10.0% by mass or less based on the total mass of the ink.

Specific examples of the pigment include inorganic pigments such as carbon black and titanium oxide; and organic pigments such as azo, phthalocyanine, quinacridone, isoindolinone, imidazolone, diketopyrrolopyrrole, dioxazine and perinone. Among these, organic pigments such as azo and quinacridone are preferable.

As a pigment dispersion method, a resin-dispersed pigment using a resin as a dispersant, a self-dispersible pigment in which a hydrophilic group is bonded to the particle surface of the pigment or the like can be used. In addition, a resin-bonded type pigment in which an organic group containing a resin is chemically bonded to the particle surface of the pigment, a microcapsule pigment in which the particle surface of the pigment is coated with a resin and the like can be used. Among these, it is preferable to use a resin-dispersed pigment in which a resin as a dispersant is physically adsorbed on the particle surface of the pigment, instead of a resin-bonded type pigment or a microcapsule pigment.

As the resin dispersant for dispersing the pigment in the aqueous medium, it is preferable to use a water-soluble resin capable of dispersing the pigment in the aqueous medium by the action of an acid group. This resin dispersant is preferably different from the block copolymer described above. The content (mass %) of the pigment in the ink is preferably 0.3 times or more to 10.0 times or less in terms of the mass ratio with respect to the content of the resin dispersant.

Examples of the resin dispersant include acrylic resins and urethane-based resins. Among these, an acrylic resin is preferable and an acrylic resin including units derived from (meth)acrylic acid and (meth)acrylic acid ester is more preferable.

As the acrylic resin, acrylic resins having a hydrophilic unit and a hydrophobic unit as segments are preferable. Among these, a resin having a hydrophilic unit derived from (meth)acrylic acid and a hydrophobic unit derived from at least one of a monomer having an aromatic ring and a (meth)acrylic acid ester-based monomer is preferable. In particular, a resin having a hydrophilic unit derived from (meth)acrylic acid and a hydrophobic unit derived from at least one monomer of styrene and α-methylstyrene is preferable. Since these resins easily cause interaction with the pigment, these resins can preferably be used as a resin dispersant for dispersing the pigment.

The hydrophilic unit is a unit having a hydrophilic group such as an acid group. The hydrophilic unit can be formed by polymerizing, for example, a hydrophilic monomer having a hydrophilic group. Specific examples of the hydrophilic monomer having a hydrophilic group include acidic monomers having a carboxylic acid group such as (meth)acrylic acid, itaconic acid, maleic acid and fumaric acid and anionic monomers such as anhydrides and salts of these acidic monomers. Examples of a cation constituting the salt of the acidic monomer include ions such as lithium, sodium, potassium, ammonium and an organic ammonium. The hydrophobic unit is a unit that does not have a hydrophilic group such as an acid group. The hydrophobic unit can be formed by polymerizing, for example, a hydrophobic monomer having no hydrophilic group such as an acid group. Specific examples of the hydrophobic monomer include monomers having an aromatic group such as styrene, α-methylstyrene and benzyl (meth)acrylate and (meth)acrylic acid esters such as methyl (meth)acrylate, butyl (meth)acrylate and 2-ethylhexyl (meth)acrylate.

As the self-dispersible pigment, a pigment in which an acid group such as a carboxylic acid group, a sulfonic acid group or a phosphonic acid group is bonded to the particle surface of the pigment directly or via another atomic group (—R—) can be used. The acid group may be of either an acid type or a salt type, and when the acid group is of a salt type, the acid group may be in a state in which a part thereof is dissociated or in a state in which the entirety thereof is dissociated. When the acid group is of a salt type, examples of the cation that becomes a counter ion include alkali metal cations, ammonium and an organic ammonium. Specific examples of another atomic group (—R—) include a linear or branched alkylene group having 1 to 12 carbon atoms; an arylene group such as a phenylene group or a naphthylene group; a carbonyl group; an imino group; an amide group; a sulfonyl group; an ester group; and an ether group. In addition, a group obtained by combining these groups may also be used.

As the dye, it is preferable to use a dye having an acid group. Specific examples of the dye include dyes such as azo, triphenylmethane, (aza)phthalocyanine, xanthene and anthrapyridone.

(Aqueous Medium)

The ink according to the present invention is an aqueous ink containing at least water as an aqueous medium. The ink contains an aqueous medium which is water or a mixed solvent of water and a water-soluble organic solvent. As the water, a deionized water or ion exchange water is preferably used. The content (% by mass) of the water in the aqueous ink is preferably 50.0% by mass or more to 95.0% by mass or less based on the total mass of the ink. The content (% by mass) of the water-soluble organic solvent in the aqueous ink is preferably 5.0% by mass or more to 90.0% by mass or less and more preferably 10.0% by mass or more to 50.0% by mass or less based on the total mass of the ink. As the water-soluble organic solvent, any solvent that can be used for an ink for ink jet, such as alcohols, (poly)alkylene glycols, glycol ethers, nitrogen-containing compounds and sulfur-containing compounds, can be used.

(Other Resin)

The ink can further contain a resin (other resin) other than the block copolymer and the resin dispersant described above. The other resin can be added to the ink in order to (i) stabilize the dispersed state of the pigment, that is, as a resin dispersant or an auxiliary thereof. In addition, other resins can be added to the ink in order to (ii) improve various characteristics of a recorded image. Examples of the form of the resins include a block copolymer, a random copolymer, a graft copolymer and a combination thereof. The resins may be water-soluble resins that can be dissolved in the aqueous medium or may be resin particles dispersed in the aqueous medium. The resin particle does not necessarily include the coloring material. The content (% by mass) of the other resin in the ink is preferably 0.1% by mass or more to 10.0% by mass or less and more preferably 1.0% by mass or more to 5.0% by mass or less based on the total mass of the ink.

The other resin is preferably a resin having an acid group. Specific examples of the other resin include acrylic resins, polyester-based resins, urethane-based resins, urea-based resins, polysaccharides and polypeptides. Among these, acrylic resins and urethane-based resins are preferable since the ink ejection stability is easily secured.

In the specification, the expression "resin is water-soluble" as used herein means that in the case where the resin is neutralized with an alkali equivalent to the acid value, the resin is present in an aqueous medium without forming a particle having a particle diameter that can be measurable by dynamic light scattering method. Whether the resin is water soluble or not can be determined by the following method. First, a liquid containing a resin (resin solid content: 10% by mass) neutralized with an alkali (sodium hydroxide, potassium hydroxide or the like) equivalent to the acid value is prepared. Then, the liquid thus prepared is diluted to 10 times (based on volume) with pure water to prepare a sample solution. The particle diameter of the resin in the sample solution is measured by a dynamic light scattering method. In a case where a particle having a particle diameter cannot be measured, the resin can be determined as water soluble. The measurement conditions at this time can be set, for example, as follows.

[Measurement Conditions]

SetZero: 30 seconds

Number of times of measurement: 3 times

Measurement time: 180 seconds

As the particle size distribution measuring apparatus, a particle size analyzer (for example, trade name "UPA-EX150", manufactured by Nikkiso Co., Ltd.) by a dynamic light scattering method or the like can be used. Of course, the particle size distribution measuring apparatus and the measuring conditions to be used are not limited to the above.

The acid value of the other resin is preferably 30 mgKOH/g or more to 350 mgKOH/g or less. The weight average molecular weight of the other resin in terms of polystyrene measured by gel permeation chromatography (GPC) is preferably 1,000 or more to 100,000 or less and more preferably 5,000 or more to 50,000 or less.

(Compound represented by Formula (3))

In the block copolymer used in the ink according to the present invention, two or more molecules are easily linked by hydrogen bonding while suppressing intramolecular association. Therefore, it is considered that the block copolymer is present in the ink in a widely spread state. When the free block copolymer that is not adsorbed onto the components in the ink is present in the ink in a spread state, the viscosity of the ink may be increased. Then, when the viscosity of the ink is excessively increased, the sticking recovery property of the ink may be easily lowered.

The present inventors have investigated to suppress an excessive increase in viscosity of the ink and improve the sticking recovery property while containing the above-mentioned block copolymer. As a result, it has been found that by further incorporating the compound represented by Formula (3) into the ink, an increase in the viscosity of the ink is suppressed and the sticking recovery property is further improved. That is, it is preferable that the ink according to the present invention further contains a compound represented by Formula (3). It is considered that the block copolymer present in the ink in a free state without being adsorbed onto the components in the ink exhibits an action of suppressing the increase in viscosity by forming micelles. It is presumed that the compound represented by Formula (3) suppresses an increase in the viscosity of the ink by the block copolymer functioning as a core for forming micelles and promoting the formation of micelles.

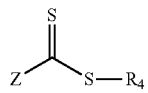

(3)

In Formula (3), Z represents an amino group, an alkyl group, an aryl group, an alkoxy group, an aryloxy group, an alkylthio group or an arylthio group and $R_4$ represents a segment having an acid group.

Z represents an amino group, an alkyl group, an aryl group, an alkoxy group, an aryloxy group, an alkylthio group or an arylthio group and may have a substituent. The alkyl group is preferably a linear or branched alkyl group having 1 to 16 carbon atoms and examples thereof include a methyl group, an ethyl group, an n-propyl group, an iso-propyl group, a hexyl group, a decyl group and a dodecyl group. The aryl group is preferably an aryl group having 6 to 10 carbon atoms and examples thereof include a phenyl group and a naphthyl group. The alkoxy group is preferably a linear or branched alkoxy group having 1 to 16 carbon atoms and examples thereof include a methoxy group, an ethoxy group, an n-propoxy group, an iso-propoxy group, a hexyloxy group, a decyloxy group and a dodecyloxy group. As the aryloxy group, an aryloxy group having 6 to 10 carbon atoms is preferable and examples thereof include a phenoxy group and a naphthoxy group. The alkylthio group is preferably a linear or branched alkylthio group having 1 to 16 carbon atoms and examples thereof include a methylthio group, an ethylthio group, an n-propylthio group, an iso-propylthio group, a hexylthio group, a decylthio group and a dodecylthio group. As the arylthio group, an arylthio group having 6 to 10 carbon atoms is preferable and examples thereof include a phenylthio group and a naphthylthio group. Examples of the above-mentioned substituent include halogen atoms such as a fluorine atom, a chlorine atom and a bromine atom; acid groups such as a carboxylic acid group, a sulfonic acid group and a phosphonic acid group; a hydroxy group; and an amino group.

$R_4$ represents a segment having an acid group. Examples of the monomer for constituting this segment include those similar to those exemplified as the monomer for forming the segment B described above. Further, in addition to the monomer having an acid group, a monomer having no acid group can be further used. Examples of the monomer having no acid group include the same monomers as those exemplified as the monomer for forming the segment A described above. $R_4$ is preferably a copolymerization segment of (meth)acrylic acid and (meth)acrylic acid ester and more preferably a copolymerization segment of methacrylic acid and methacrylic acid ester.

From the viewpoint of setting the viscosity of the ink within an appropriate range, the molecular weight of the compound represented by Formula (3) is preferably 1,000 or less. The content (mass %) of the compound represented by Formula (3) in the ink is preferably 10 ppm or more to 1,000 ppm or less and more preferably 10 ppm or more to 100 ppm or less based on the total mass of the ink. When the content of the compound represented by Formula (3) is less than 10 ppm, the effect of suppressing an increase in the viscosity of the ink is weak and the sticking recovery property may be easily lowered. On the other hand, when the content of the compound represented by Formula (3) is more than 1,000 ppm, the odor peculiar to the sulfur compound may be easily perceived and the sticking recovery property of the ink may be easily lowered.

(Other Additives)

The ink may contain, in addition to the above-described components, various additives such as a surfactant, a pH regulator, a viscosity modifier, a rust inhibitor, a preservative, a fungicide, an antioxidant and a reduction inhibitor as necessary.

Examples of the surfactant include anionic surfactants, cationic surfactants and nonionic surfactants. The content (% by mass) of the surfactant in the ink is preferably 0.1% by mass or more to 5.0% by mass or less and more preferably 0.1% by mass or more to 2.0% by mass or less based on the total mass of the ink.

<Ink Cartridge>

An ink cartridge according to the present invention includes an ink and an ink storage portion storing the ink. The ink contained in the ink storage portion is the aqueous ink of the present invention described above. FIG. 1 is a cross-sectional view schematically illustrating an exemplary embodiment of an ink cartridge of the present invention. As illustrated in FIG. 1, an ink supply port 12 for supplying an ink to a recording head is arranged on the bottom surface of the ink cartridge. The inside of the ink cartridge is an ink storage portion for storing the ink. The ink storage portion includes an ink storage chamber 14 and an absorber storage chamber 16 and the chambers communicate with each other through a communication port 18. In addition, the absorber storage chamber 16 communicates with the ink supply port 12. While a liquid ink 20 is stored in the ink storage chamber 14, absorbers 22 and 24 each holding the ink in a state of being impregnated therewith are stored in the absorber storage chamber 16. The ink storage portion may be of a form that is free of the ink storage chamber that stores the liquid ink and holds the total amount of the ink to be stored with the absorbers. In addition, the ink storage portion may be of a form that is free of any absorber and stores the total amount of the ink in a liquid state. Further, an ink cartridge of a form formed to have an ink storage portion and a recording head may be adopted.

<Ink Jet Recording Method>

An ink jet recording method according to the present invention is a method including ejecting the aqueous ink of the present invention described above from an ink jet recording head to record an image on a recording medium. Examples of a system of ejecting an ink include a system of applying a mechanical energy to an ink and a system of applying a thermal energy to an ink. In the present invention, it is particularly preferable to employ a system of ejecting an ink by applying a thermal energy to the ink. Steps of the ink jet recording method may be those publicly known except that the ink according to the present invention is used.

Figure 2A:
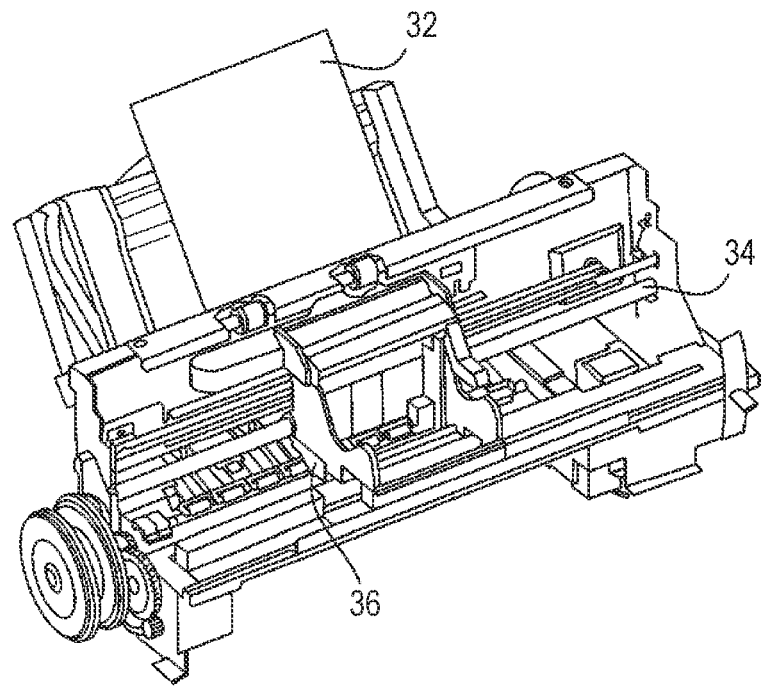
FIGS. 2A and 2B are views schematically illustrating an example of an ink jet recording apparatus used in an ink jet recording method according to the present invention.
Figure 2B:
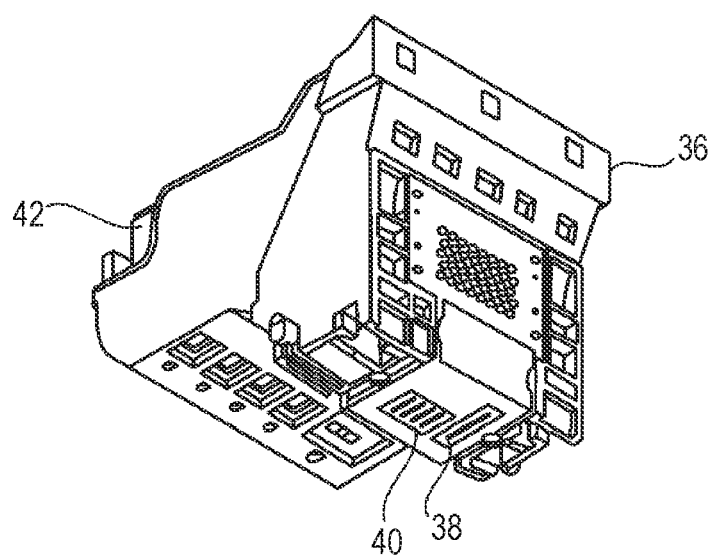

FIGS. 2A and 2B are views schematically illustrating an example of an ink jet recording apparatus used in the ink jet recording method of the present invention, FIG. 2A is a perspective view of a principal part of the ink jet recording apparatus and FIG. 2B is a perspective view illustrating a head cartridge. In the ink jet recording apparatus, a conveyance unit (not shown) that conveys a recording medium 32 and a carriage shaft 34 are provided. A head cartridge 36 can be mounted on the carriage shaft 34. The head cartridge 36 includes recording heads 38 and 40 and is configured such that an ink cartridge 42 is set. The ink (not illustrated) is ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32. Any recording medium may be used as a recording medium on which recording is performed using the ink according to the present invention. Among them, it is preferable to use a paper-based recording medium having permeability such as a recording medium having no coating layer such as plain paper or a recording medium having a coating layer such as glossy paper or mat paper.

EXAMPLES

Hereinafter, the present invention will be described in more detail by way of Examples and Comparative Examples. However, the present invention is not intended to be limited to the following examples as long as the present invention does not depart from its gist. In the description of the amounts of components, "part(s)" and "%" are based on mass unless otherwise specified.

<Measuring Method of Physical Property Value>
(Acid Value of Resin (Block Copolymer))

After adding 1.0 mol/L hydrochloric acid to a liquid containing a resin (block copolymer), the generated precipitate was washed with water to obtain a solid content of the resin. The solid content of the obtained resin was added to 60 mL of a mixed solvent of water and tetrahydrofuran (water:tetrahydrofuran=1:6 (mass ratio)) and the mixture was stirred at 25° C. to dissolve the resin to prepare a sample. The prepared sample was subjected to neutralization titration and the acid value of the resin was measured. In the neutralization titration, a potential difference automatic titrator (trade name "AT510", manufactured by Kyoto Electronics Manufacturing Co., Ltd.) on which a composite glass electrode (trade name "C-171", manufactured by Kyoto Electronics Manufacturing Co., Ltd.) was mounted was used. As a titration reagent, a 0.5 mol/L potassium hydroxide ethanol solution was used.

(Number Average Molecular Weight of A Block and B Block)

The A block or block copolymer was added to tetrahydrofuran, and the mixture was stirred at 25° C. for 24 hours to dissolve and then filtered through a membrane filter to obtain a sample. The content of the resin (A block or block copolymer) in the sample was adjusted to be about 0.3%. The obtained sample was subjected to gel permeation chromatography (GPC) according to the following conditions. Then, the number average molecular weight in terms of polystyrene was calculated using a molecular weight calibration curve prepared using a standard polystyrene resin. The value obtained by subtracting the number average molecular weight of the A block from the number average molecular weight of the block copolymer was defined as the number average molecular weight of the B block. As the standard polystyrene resin, trade names "TSK STANDARD POLYSTYRENE F-850, F-450, F-288, F-128, F-80, F-40, F-20, F-10, F-4, F-2, F-1, A-5000, A-2500, A-1000 and A-500, manufactured by Tosoh Corporation, were used.

[GPC Conditions]
HPLC apparatus: trade name "2695 Separations Module" (manufactured by Waters Corporation)
Differential refractive index (RI) detector: trade name "2414 detector" (manufactured by Waters Corporation)
Column: four continuous columns of trade name "GPC KF-806M" (manufactured by Showa Denko K. K.)
Eluent: tetrahydrofuran
Flow rate: 1.0 mL/min
Oven temperature: 40° C.
Sample injection amount: 100 μL <Production of Resin (Block Copolymer)>
(Resins 1 to 45)

A four-necked flask equipped with a stirrer, a thermometer, a nitrogen gas introduction pipe and a reflux tube was purged with nitrogen. In this flask, 100.0 parts of methyl isobutyl ketone, the type and the amount of "RAFT agent", the monomer (unit: part) of "Segment A1" and a polymerization initiator (azobisisobutyronitrile) in an amount of 0.25 times the amount of "RAFT agent" shown in Table 1 were placed. The amount of this polymerization initiator used is the amount consumed by RAFT polymerization. After purging with nitrogen at 25° C. for 30 minutes, the temperature was raised to 80° C. to start the reaction. The reaction solution was extracted at regular intervals and the dry solid content in the solution was measured to calculate the polymerization rate. In addition, the molecular weight of the obtained product was measured using a part of the extracted reaction solution.

After confirming that the polymerization rate reached to 90% or more, the monomer (unit: part) shown in "Segment A2" in Table 1 was added and further reacted. A sample was taken out from the flask at regular intervals, a part of the sample was dried and the polymerization rate was calculated from the concentration of the solid content in the sample. In addition, the number average molecular weight of the produced resin was measured using a part of the sample taken out. After confirming that the polymerization rate reached to 90% or more, the monomer (unit: part) shown in "Segment B1" and the monomer (unit: part) shown in "Segment B2" in Table 1 were sequentially added and further reacted.

Next, the "terminal treating agent" of the type shown in Table 1 was dissolved in 10.0 parts of tetrahydrofuran at 4.0 times (molar ratio) the amount of the RAFT agent used to prepare a solution. The total amount of this solution was added into a flask heated to the "terminal treatment temperature" shown in Table 1 and further reacted for 30 minutes. The polymerization rate was calculated in the same manner as described above, after confirming that the final polymerization rate was 98%, 50.0 parts of methyl isobutyl ketone was added and the flask was cooled to stop the reaction. The reaction solution was added to a large amount of n-hexane and the produced precipitate was vacuum dried at 40° C. for 24 hours to obtain a resin (block copolymer). Potassium hydroxide in an amount 0.9 times the acid value of the resin in terms of molar ratio and an appropriate amount of ion exchange water were added to prepare a liquid containing the resin having a resin (solid content) content of 10.0%. Since the water solubility of the resin 45 was low, a liquid containing the resin having a resin (solid content) content of 8.0% was prepared. The terminal structures of the obtained resin segments A and B are shown in Table 2 as an acid type (H type). * represents the bonding position to the terminal of each segment. The acid value of the resin (acid value corresponding to all carboxylic acid groups), the number average molecular weight (Mn), the number average molecular weight of the A block (MnA), the number average molecular weight of the B block (MnB) and the (MnB/MnA) of the number average molecular weight of the B block/the number average molecular weight of the A block are shown in Table 2. The meanings of the abbreviations in Table 1 are shown below.

[Monomer]
BzMA: benzyl methacrylate
St: styrene
NBMA: n-butyl methacrylate
MMA: methyl methacrylate
HEMA: 2-hydroxyethyl methacrylate
MAA: methacrylic acid
AA: acrylic acid

[RAFT Agent]
RAFT agent 1: 4-cyano-4-[(dodecylsulfanylthiocarbonyl)sulfanyl]pentanoic acid
RAFT agent 2: 2-(dodecylthiocarbonothioylthio)propionic acid
RAFT agent 3: S-(thiobenzoyl)thioglycolic acid
RAFT agent 4: 2-cyanoprop-2-yl-dithiobenzoate
[Terminal Treating Agent]
Terminal treating agent 1: 2,2'-azobis(2,4-dimethylvaleronitrile)
Terminal treating agent 2: 4,4'-azobis(4-cyanovaleric acid)
Terminal treating agent 3: 1,1'-azobis(cyclohexane-1-carbonitrile)
Terminal treating agent 4: 2,2'-azobis(isobutyronitrile)
Terminal treating agent 5: 2,2'-azobis(4-methoxy-2,4-dimethylvaleronitrile)
Terminal treating agent 6: 2,2'-azobis(2-methylbutyronitrile)

TABLE 1

Production conditions of resin (block copolymer)

| | RAFT agent | | A Block | | | | | | | | | | B Block |
| | | Amount used | Segment A1 | | | | | | Segment A2 | | | | Segment B1 |
| Resin | Type | (parts) | BzMA | St | nBMA | MMA | HEMA | MAA | BzMA | St | nBMA | MMA | BzMA |
|---|---|---|---|---|---|---|---|---|---|---|---|---|---|
| 1 | 1 | 1.5 | 50.0 | | | | | | | | | | 10.0 |
| 2 | 1 | 1.5 | | 50.0 | | | | | | | | | 10.0 |
| 3 | 1 | 1.5 | | | 50.0 | | | | | | | | 10.0 |
| 4 | 1 | 1.5 | 30.0 | | 20.0 | | | | | | | | 10.0 |
| 5 | 1 | 1.5 | 30.0 | | | 20.0 | | | | | | | 10.0 |
| 6 | 1 | 1.5 | 30.0 | | | | 20.0 | | | | | | 10.0 |
| 7 | 1 | 1.5 | 20.0 | | | | | | 10.0 | 20.0 | | | 10.0 |
| 8 | 1 | 1.5 | 20.0 | | | | | | 10.0 | | 20.0 | | 10.0 |
| 9 | 1 | 1.5 | 20.0 | | | | | | 10.0 | | | 20.0 | 10.0 |
| 10 | 1 | 1.5 | 50.0 | | | | | | | | | | 30.0 |
| 11 | 1 | 1.5 | 50.0 | | | | | | | | | | 10.0 |
| 12 | 1 | 1.5 | 50.0 | | | | | | | | | | 10.0 |
| 13 | 1 | 1.5 | 50.0 | | | | | | | | | | 10.0 |
| 14 | 1 | 1.5 | 50.0 | | | | | | | | | | 20.0 |
| 15 | 1 | 1.5 | 50.0 | | | | | | | | | | 10.0 |
| 16 | 1 | 1.5 | 50.0 | | | | | | | | | | 10.0 |
| 17 | 1 | 1.5 | 50.0 | | | | | | | | | | 10.0 |
| 18 | 1 | 1.5 | 50.0 | | | | | | | | | | 10.0 |
| 19 | 1 | 1.5 | 50.0 | | | | | | | | | | 10.0 |
| 20 | 1 | 1.5 | 50.0 | | | | | | | | | | 10.0 |
| 21 | 2 | 1.5 | 50.0 | | | | | | | | | | 10.0 |
| 22 | 3 | 1.5 | 50.0 | | | | | | | | | | 10.0 |
| 23 | 1 | 1.5 | 50.0 | | | | | | | | | | 10.0 |
| 24 | 1 | 1.5 | 50.0 | | | | | | | | | | 10.0 |
| 25 | 1 | 1.5 | 50.0 | | | | | | | | | | 10.0 |
| 26 | 1 | 1.5 | 50.0 | | | | | | | | | | 10.0 |
| 27 | 1 | 1.5 | 50.0 | | | | | | | | | | 10.0 |
| 28 | 2 | 1.5 | 50.0 | | | | | | | | | | 10.0 |
| 29 | 3 | 1.5 | 50.0 | | | | | | | | | | 10.0 |
| 30 | 1 | 1.5 | 50.0 | | | | | | | | | | 10.0 |
| 31 | 1 | 1.5 | 50.0 | | | | | | | | | | 10.0 |
| 32 | 1 | 1.5 | 50.0 | | | | | | | | | | 10.0 |
| 33 | 1 | 1.5 | 50.0 | | | | | | | | | | 10.0 |
| 34 | 1 | 3.0 | 50.0 | | | | | | | | | | 10.0 |
| 35 | 1 | 2.8 | 50.0 | | | | | | | | | | 10.0 |
| 36 | 1 | 0.7 | 50.0 | | | | | | | | | | 10.0 |
| 37 | 1 | 0.5 | 50.0 | | | | | | | | | | 10.0 |
| 38 | 1 | 1.5 | 60.0 | | | | | | | | | | 5.0 |
| 39 | 1 | 1.5 | 55.0 | | | | | | | | | | 5.0 |
| 40 | 1 | 1.5 | 45.0 | | | | | | | | | | 15.0 |
| 41 | 1 | 1.5 | 40.0 | | | | | | | | | | 20.0 |
| 42 | 1 | 1.5 | 40.0 | | | | 10.0 | | | | | | 20.0 |
| 43 | 1 | 1.5 | 50.0 | | | | | | | | | | 10.0 |
| 44 | 1 | 1.5 | 50.0 | | | | | | | | | | 10.0 |
| 45 | 4 | 1.5 | 50.0 | | | | | | | | | | 10.0 |

| | B Block | | | | | | | | | | | Type of terminal treating agent | Terminal treatment temperature (° C.) |
| | Segment B1 | | | | | | Segment B2 | | | | | | |
| Resin | St | nBMA | MMA | HEMA | MAA | AA | BzMA | St | nBMA | MMA | MAA | | |
|---|---|---|---|---|---|---|---|---|---|---|---|---|---|
| 1 | | 20.0 | | | 20.0 | | | | | | | 1 | 90 |
| 2 | 10.0 | 20.0 | | | 20.0 | | | | | | | 1 | 90 |
| 3 | | 20.0 | | | 20.0 | | | | | | | 1 | 90 |
| 4 | | 20.0 | | | 20.0 | | | | | | | 1 | 90 |

TABLE 1-continued

Production conditions of resin (block copolymer)

| Resin | M1 | M2 | M3 | M4 | M5 | M6 | M7 | N | T |
|---|---|---|---|---|---|---|---|---|---|
| 5 | 20.0 | 20.0 | | | | | | 1 | 90 |
| 6 | 20.0 | 20.0 | | | | | | 1 | 90 |
| 7 | 20.0 | 20.0 | | | | | | 1 | 90 |
| 8 | 20.0 | 20.0 | | | | | | 1 | 90 |
| 9 | 20.0 | 20.0 | | | | | | 1 | 90 |
| 10 | | | 20.0 | | | | | 1 | 90 |
| 11 | 20.0 | | 20.0 | | | | | 1 | 90 |
| 12 | | 20.0 | 20.0 | | | | | 1 | 90 |
| 13 | 23.0 | | 17.0 | | | | | 1 | 90 |
| 14 | | | 10.0 | | 10.0 | | 10.0 | 1 | 90 |
| 15 | 10.0 | | 10.0 | | 10.0 | | 10.0 | 1 | 90 |
| 16 | | 10.0 | 10.0 | | 10.0 | | 10.0 | 1 | 90 |
| 17 | | 10.0 | 10.0 | | 10.0 | | 10.0 | 1 | 90 |
| 18 | | 10.0 | 10.0 | 10.0 | | | 10.0 | 1 | 90 |
| 19 | | 10.0 | 10.0 | | 10.0 | | 10.0 | 1 | 90 |
| 20 | | 10.0 | 10.0 | | | 10.0 | 10.0 | 1 | 90 |
| 21 | 20.0 | | 20.0 | | | | | 1 | 90 |
| 22 | 20.0 | | 20.0 | | | | | 1 | 90 |
| 23 | 20.0 | | 20.0 | | | | | 2 | 90 |
| 24 | 20.0 | | 20.0 | | | | | 3 | 110 |
| 25 | 20.0 | | 20.0 | | | | | 4 | 90 |
| 26 | 20.0 | | 20.0 | | | | | 5 | 90 |
| 27 | 20.0 | | 20.0 | | | | | 6 | 90 |
| 28 | 20.0 | | 20.0 | | | | | 2 | 90 |
| 29 | 20.0 | | 20.0 | | | | | 2 | 90 |
| 30 | 28.0 | | 12.0 | | | | | 1 | 90 |
| 31 | 25.0 | | 15.0 | | | | | 1 | 90 |
| 32 | 15.0 | | 25.0 | | | | | 1 | 90 |
| 33 | 12.0 | | 28.0 | | | | | 1 | 90 |
| 34 | 20.0 | | 20.0 | | | | | 1 | 90 |
| 35 | 20.0 | | 20.0 | | | | | 1 | 90 |
| 36 | 20.0 | | 20.0 | | | | | 1 | 90 |
| 37 | 20.0 | | 20.0 | | | | | 1 | 90 |
| 38 | 15.0 | | 20.0 | | | | | 1 | 90 |
| 39 | 20.0 | | 20.0 | | | | | 1 | 90 |
| 40 | 20.0 | | 20.0 | | | | | 1 | 90 |
| 41 | 20.0 | | 20.0 | | | | | 1 | 90 |
| 42 | 20.0 | | 10.0 | | | | | 1 | 90 |
| 43 | 20.0 | 20.0 | | | | | | 1 | 90 |
| 44 | 20.0 | | 20.0 | | | | | — | — |
| 45 | 20.0 | | 20.0 | | | | | 1 | 90 |

TABLE 2

Characteristics of resin (block copolymer)

| Resin | Terminal structure Segment A | Terminal structure Segment B | Acid value (mgKOH/g) | Mn | MnA | MnB | MnB/MnA |
|---|---|---|---|---|---|---|---|
| 1 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 2 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 3 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 4 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 5 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 6 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 7 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 8 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 9 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 10 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 11 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 12 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 13 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 14 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 15 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 16 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 17 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 18 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 19 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 20 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 21 | *—CH(CH$_3$)—COOH | *—C(CH$_3$)(CN)—CH$_2$—CH(CH$_3$)$_2$ | 135 | 7,680 | 3,840 | 3,840 | 1.0 |
| 22 | *—CH$_2$—COOH | *—C(CH$_3$)(CN)—CH$_2$—CH(CH$_3$)$_2$ | 135 | 7,680 | 3,840 | 3,840 | 1.0 |
| 23 | *—C(CH$_3$)(CN)—C$_2$H$_4$—COOH | *—C(CH$_3$)(CN)—C$_2$H$_4$—COOH | 135 | 7,680 | 3,840 | 3,840 | 1.0 |

TABLE 2-continued

Characteristics of resin (block copolymer)

| | Terminal structure | | Physical properties | | | | |
|---|---|---|---|---|---|---|---|
| | | | Acid value | | | | MnB/ |
| Resin | Segment A | Segment B | (mgKOH/g) | Mn | MnA | MnB | MnA |
| 24 | *—C(CH$_3$)(CN)—C$_2$H$_4$—COOH | *—C(cyclo-C$_6$H$_{10}$)(CN) | 135 | 7,680 | 3,840 | 3,840 | 1.0 |
| 25 | *—C(CH$_3$)(CN)—C$_2$H$_4$—COOH | *—C(CH$_3$)(CN)—CH$_3$ | 135 | 7,680 | 3,840 | 3,840 | 1.0 |
| 26 | *—C(CH$_3$)(CN)—C$_2$H$_4$—COOH | *—C(CH$_3$)(CN)—CH$_2$—C(CH$_3$)$_2$(OCH$_3$) | 135 | 7,680 | 3,840 | 3,840 | 1.0 |
| 27 | *—C(CH$_3$)(CN)—C$_2$H$_4$—COOH | *—C(CH$_3$)(CN)—C$_2$H$_5$ | 135 | 7,680 | 3,840 | 3,840 | 1.0 |
| 28 | *—CH(CH$_3$)—COOH | *—C(CH$_3$)(CN)—C$_2$H$_4$—COOH | 135 | 7,680 | 3,840 | 3,840 | 1.0 |
| 29 | *—CH$_2$—COOH | *—C(CH$_3$)(CN)—C$_2$H$_4$—COOH | 135 | 7,680 | 3,840 | 3,840 | 1.0 |
| 30 | *—C(CH$_3$)(CN)—C$_2$H$_4$—COOH | *—C(CH$_3$)(CN)—CH$_2$—CH(CH$_3$)$_2$ | 80 | 7,680 | 3,840 | 3,840 | 1.0 |
| 31 | *—C(CH$_3$)(CN)—C$_2$H$_4$—COOH | *—C(CH$_3$)(CN)—CH$_2$—CH(CH$_3$)$_2$ | 100 | 7,680 | 3,840 | 3,840 | 1.0 |
| 32 | *—C(CH$_3$)(CN)—C$_2$H$_4$—COOH | *—C(CH$_3$)(CN)—CH$_2$—CH(CH$_3$)$_2$ | 160 | 7,680 | 3,840 | 3,840 | 1.0 |
| 33 | *—C(CH$_3$)(CN)—C$_2$H$_4$—COOH | *—C(CH$_3$)(CN)—CH$_2$—CH(CH$_3$)$_2$ | 180 | 7,680 | 3,840 | 3,840 | 1.0 |
| 34 | *—C(CH$_3$)(CN)—C$_2$H$_4$—COOH | *—C(CH$_3$)(CN)—CH$_2$—CH(CH$_3$)$_2$ | 135 | 4,500 | 2,250 | 2,250 | 1.0 |
| 35 | *—C(CH$_3$)(CN)—C$_2$H$_4$—COOH | *—C(CH$_3$)(CN)—CH$_2$—CH(CH$_3$)$_2$ | 135 | 5,000 | 2,500 | 2,500 | 1.0 |
| 36 | *—C(CH$_3$)(CN)—C$_2$H$_4$—COOH | *—C(CH$_3$)(CN)—CH$_2$—CH(CH$_3$)$_2$ | 135 | 20,000 | 10,000 | 10,000 | 1.0 |
| 37 | *—C(CH$_3$)(CN)—C$_2$H$_4$—COOH | *—C(CH$_3$)(CN)—CH$_2$—CH(CH$_3$)$_2$ | 135 | 21,000 | 10,500 | 10,500 | 1.0 |
| 38 | *—C(CH$_3$)(CN)—C$_2$H$_4$—COOH | *—C(CH$_3$)(CN)—CH$_2$—CH(CH$_3$)$_2$ | 135 | 7,680 | 4,518 | 3,162 | 0.7 |
| 39 | *—C(CH$_3$)(CN)—C$_2$H$_4$—COOH | *—C(CH$_3$)(CN)—CH$_2$—CH(CH$_3$)$_2$ | 135 | 7,680 | 4,267 | 3,413 | 0.8 |
| 40 | *—C(CH$_3$)(CN)—C$_2$H$_4$—COOH | *—C(CH$_3$)(CN)—CH$_2$—CH(CH$_3$)$_2$ | 135 | 7,680 | 3,491 | 4,189 | 1.2 |
| 41 | *—C(CH$_3$)(CN)—C$_2$H$_4$—COOH | *—C(CH$_3$)(CN)—CH$_2$—CH(CH$_3$)$_2$ | 135 | 7,680 | 3,339 | 4,341 | 1.3 |
| 42 | *—C(CH$_3$)(CN)—C$_2$H$_4$—COOH | *—C(CH$_3$)(CN)—CH$_2$—CH(CH$_3$)$_2$ | 135 | 7,680 | 3,840 | 3,840 | 1.0 |
| 43 | *—C(CH$_3$)(CN)—C$_2$H$_4$—COOH | *—C(CH$_3$)(CN)—CH$_2$—CH(CH$_3$)$_2$ | 20 | 7,680 | 3,840 | 3,840 | 1.0 |
| 44 | *—C(CH$_3$)(CN)—C$_2$H$_4$—COOH | — | 135 | 7,680 | 3,840 | 3,840 | 1.0 |
| 45 | *—C(CH$_3$)(CN)—CH$_3$ | *—C(CH$_3$)(CN)—CH$_2$—CH(CH$_3$)$_2$ | 135 | 7,680 | 3,840 | 3,840 | 1.0 |

(Efficiency of Terminal Treatment)

A resin 25-1 (in which the terminal treatment temperature was changed to 60° C.) and a resin 25-2 (in which the terminal treatment temperature was changed to 70° C.) were obtained in the same method as the method for producing the resin 25 except that the terminal treatment temperature was changed by using the terminal treating agent 4 having a 10-hour half-life temperature of about 60° C. The final polymerization rate of the resin 25-1 reached only 86%. Further, the molecular weight distribution (Mw/Mn) of the resin 25 obtained at a terminal treatment temperature of 90° C. was 1.2, whereas the molecular weight distribution of the resin 25-2 obtained at a terminal treatment temperature of 70° C. was 1.3. From these results, it can be understood that it is preferable to conduct reaction at a temperature higher than the 10-hour half-life temperature by 20° C. or more.

(Resin 46)

A resin 46 was synthesized according to the description of Synthesis Example 4 of Japanese Patent Application Laid-Open No. 2008-195769. A mixture was obtained by mixing 0.5 mmol of copper (I) bromide, 1.0 mmol of bipyridine, 1.0 mmol of ethyl 2-bromoisopropionate, 100 mmol of benzyl methacrylate (BzMA) and 15 g of dimethylformamide in a nitrogen atmosphere. The dissolved oxygen in the obtained mixture was substituted with nitrogen and then reacted at 90° C. for polymerization. Polymerization was carried out while confirming the polymerization rate by analysis by gas chromatography, and the reaction was stopped by rapid cooling with liquid nitrogen. The reaction solution was passed through an alumina column to remove the copper catalyst, then added to methanol, and the produced precipitate was dried under reduced pressure to obtain benzyl polymethacrylate (p(BzMA)) as an A block. The number average molecular weight (Mn) of p(BzMA) was 8,800. A bromine atom is bonded to the terminal of the obtained p(BzMA).

0.4 mmol of the obtained p(BzMA), 0.2 mmol of copper (I) chloride, 0.2 mmol of pentamethyldiethylenetriamine, 60 mmol of BzMA, 60 mmol of t-butyl (tBA) acrylate and 30 mL of dimethylformamide were mixed to obtain a mixture. The dissolved oxygen in the obtained mixture was substituted with nitrogen and then reacted at 90° C. for polymerization. Polymerization was carried out while confirming the polymerization rate by analysis by gas chromatography, and the reaction was stopped by rapid cooling with liquid nitrogen.

The reaction solution was passed through an alumina column to remove the copper catalyst, then added to methanol, and the produced precipitate was dried under reduced pressure to obtain a dried product. The obtained dried product was dissolved in tetrahydrofuran and then hydrolyzed by adding concentrated hydrochloric acid under a reflux condition. The reaction solution was added to methanol, and the produced precipitate was dried under reduced pressure to hydrolyze at least a part of the ester of the unit derived from tBA in the B block. Thus, a block copolymer containing a unit that becomes an acid type carboxylic acid group was obtained. The B block thus obtained includes units derived from t-butyl acrylate (tBA) and acrylic acid (AA) respectively. The number average molecular weight (Mn) of the B block was 6,200. Potassium hydroxide in an amount 0.9 times the acid value of the resin in terms of molar ratio and an appropriate amount of ion exchange water were added to obtain a liquid containing resin 46 having a resin (solid content) content of 10.0%. The acid value of the resin 46 was 131 mgKOH/g, the number average molecular weight (Mn) was 15,000 and the number average molecular weight of the B block/the number average molecular weight of the A block (MnB/MnA) was 0.7.

(Resin 47)

A resin 47 was synthesized according to the method for synthesizing polymer aqueous solution 73 described in Japanese Patent Application Laid-Open No. 2012-072357. In a nitrogen purged glove box, 0.650 g of styrene and 0.015 g of (1-methyltellanyl-ethyl)benzene were reacted at 100° C. for 30 hours. Then, 0.119 g of 2-hydroxyethyl methacrylate was added and the mixture was reacted at 100° C. for 30 hours. Further, 0.231 g of methacrylic acid was added and the mixture was reacted at 100° C. for 30 hours. The obtained product was dissolved in 5 mL of chloroform to prepare a solution. This solution was poured into 300 mL of a water/methanol mixed solution (water:methanol=1:4 (mass ratio)) under stirring, and the produced precipitate was dried by suction filtration to obtain a resin (block copolymer). Potassium hydroxide in an amount 0.8 times the acid value of the resin in terms of molar ratio and an appropriate amount of ion exchange water were added and stirred, then the solvent was removed by reducing the pressure, and an appropriate amount of ion exchange water was further added. Thus, a liquid containing resin 47 having a resin (solid content) content of 10.0% was obtained. The acid value of the resin 47 was 151 mgKOH/g and the number average molecular weight (Mn) was 10,000.

(Resin 48)

A resin 48 was synthesized according to Example 58 in Japanese Patent Application Laid-Open No. 2000-515181. A solution was prepared by mixing 2 mL of styrene and 32.8 mg of 4-cyano-4-(thiobenzoylthio)pentanoic acid. 1 mL of the prepared solution was placed in an ampoule, degassed and sealed. The ampoule was heated to 100° C. and polymerized to obtain a styrene homopolymer (resin 48). When the bonding position to the terminal of the polymer was represented by *, the structure of one terminal of the resin 48 is *—C(CH$_3$)(CN)—C$_2$H$_4$—COOH and the structure of the other terminal was *—S—C(=S)—C$_6$H$_5$. The number average molecular weight (Mn) of the resin 48 was 8,900. Since the obtained resin C was not dissolved in water, a liquid containing the resin 48 could not be prepared.

(Resin 49)

A resin 49 was synthesized according to a fixing resin 1 described in Japanese Patent Application Laid-Open No. 2018-203802. A reaction vessel equipped with a gas introduction tube, a thermometer, a condenser and a stirrer was prepared. In this reaction vessel, 20.0 parts of toluene, 7.5 parts of methacrylic acid, 7.5 parts of methyl methacrylate, 0.9 parts of 2,2'-azobisisobutyronitrile and 3.6 parts of 2-(dodecylthiocarbonothioylthio)-isobutyric acid were placed. After purging with nitrogen gas, the temperature was raised to 75° C. and the reaction was carried out for 3 hours to obtain a copolymer including units derived from each of methacrylic acid and methyl methacrylate, which became an A block. After cooling to 25° C., 60.0 parts of toluene, 60.0 parts of methyl methacrylate and 25.0 parts of butyl methacrylate were placed in the reaction vessel. After purging with nitrogen gas, the temperature was raised to 75° C., the reaction was carried out for 3 hours, and an AB block copolymer (resin 49) in which the copolymer (B block) including units derived from each of methyl methacrylate and butyl methacrylate was added to the A block was obtained. The mixture was cooled to 25° C., 9.3 parts of dimethylaminoethanol was added to neutralize the acid groups and then 200.0 parts of water was added. Next, toluene formed an azeotrope with water to distill off toluene and then an appropriate amount of ion exchange water was added to obtain a liquid containing the resin 49 having a resin (solid content) content of 10.0%. When the bonding position to the terminal of the segment A was represented by *, the structure of the terminal of the segment A of the resin 49 was *—C(CH$_3$)$_2$—COOH. The acid value of the resin 49 was 49 mgKOH/g, the number average molecular weight (Mn) was 9,800 and the number average molecular weight of the B block/the number average molecular weight of the A block (MnB/MnA) was 5.5.

(Resin 50)

A resin 50 (styrene-ethyl acrylate-acrylic acid copolymer), which is a random copolymer, was obtained by copolymerizing monomers by a conventional method. Potassium hydroxide in an amount 1.0 times the acid value of the resin in terms of molar ratio and an appropriate amount of ion exchange water were added and stirred to obtain a liquid containing the resin 50 having a resin (solid content) of 10.0%. The acid value of the resin 50 was 167 mgKOH/g and the weight average molecular weight of the resin 50 measured by GPC was 10,000.

<Preparation of Pigment Dispersion Liquid>

(Pigment Dispersion Liquid 1)

A mixture of 10.0 parts of a pigment, 60.0 parts of a liquid containing a resin 50 and 30.0 parts of ion exchange water was placed in a batch-type vertical sand mill (manufactured by IMEX Co., Ltd.) filled with 200 parts of diameter zirconia beads with a diameter of 0.3 mm and dispersed for 5 hours. As the pigments, solid solution pigment of C.I. Pigment Violet 19 and C.I. Pigment Red 122 were used. The resultant was centrifuged to remove coarse particles and then pressure-filtered with a microfilter (manufactured by Fujifilm Corporation) having a pore diameter of 3.0 μm to obtain a pigment dispersion liquid 1. The pigment content in the pigment dispersion liquid 1 was 10.0% and the resin content was 6.0%.

(Pigment Dispersion Liquid 2)

A pigment dispersion liquid 2 was obtained in the same manner as in the case of the preparation of the pigment dispersion liquid 1 except that instead of using the solid solution pigment of C.I. Pigment Violet 19 and C.I. Pigment Red 122, C.I. Pigment Yellow 74 was used. The pigment content in the pigment dispersion liquid 2 was 10.0% and the resin content was 6.0%.

(Pigment Dispersion Liquid 3)

A pigment dispersion liquid 3 was obtained in the same manner as in the case of the preparation of the pigment dispersion liquid 1 except that the aqueous solution of the resin 1 was used as the liquid containing the resin. The pigment content in the pigment dispersion liquid 3 was 10.0% and the resin content was 6.0%.

(Pigment Dispersion Liquid 4)

A solution prepared by dissolving 5.0 g of concentrated hydrochloric acid in 5.5 g of water was cooled to 5° C. and in this state, 1.6 g of 4-aminobenzenesulfonic acid was added. The container containing this solution was placed in an ice bath and the solution was maintained at a temperature of 10° C. or lower by being stirred. To this solution, a solution obtained by dissolving 1.8 g of sodium nitrite in 9.0 g of water was added. After stirring for 15 minutes, 6.0 g of solid solution pigment of C.I. Pigment Violet 19 and C.I. Pigment Red 122 were added and mixed. The mixture was further stirred for 15 minutes to obtain a slurry. The obtained slurry was filtered through a filter paper (trade name "STANDARD FILTER PAPER No. 2", manufactured by ADVANTECH) and the particles were thoroughly washed with water and dried in an oven at 110° C. The resultant was treated with hydrochloric acid and then neutralized with an aqueous potassium hydroxide solution. A pigment dispersion liquid 4 in which the content of the self-dispersible pigment was adjusted to 20.0% by adding an appropriate amount of ion exchange water was obtained.

<Production of Additive A>

A four-necked flask equipped with a stirrer, a thermometer, a nitrogen gas introduction pipe and a reflux tube was purged with nitrogen. In this flask, 84.0 parts of toluene, a mixture of 5.0 parts of methacrylic acid and 5.0 parts of n-butyl methacrylate, 5.0 parts of a RAFT agent 1 and 1.0 part of azobisisobutyronitrile were placed. After purging with nitrogen at 25° C. for 30 minutes, the temperature was raised to 90° C. in a nitrogen atmosphere to start the reaction. After reacting for 4 hours, 50.0 parts of toluene was added and the flask was cooled to stop the reaction. The reaction solution was added to a large amount of n-hexane and the produced precipitate was vacuum dried at 40° C. for 24 hours to obtain an additive A corresponding to the compound represented by Formula (3) (Z: dodecylthio group, $R_4$: copolymerization segment of methacrylic acid and n-Butyl methacrylate). The molecular weight of the obtained additive A was 542.

<Preparation of Ink>

Each of the following components (unit: %) was mixed, sufficiently stirred and then pressure-filtered with a microfilter having a pore size of 2.5 μm (manufactured by Fujifilm Corporation) to prepare each ink. Among the components shown below, "ACETYLENOL E100" is a trade name of a nonionic surfactant (ethylene oxide adduct of acetylene glycol) manufactured by Kawaken Fine Chemicals Co., Ltd.

Types of resins shown in Table 3: amount in which the resin content is 0.5%
Types of coloring materials shown in Table 3: amount at which the content of the coloring material is 5.0%
Glycerin: 5.0%
Triethylene glycol: 10.0%
ACETYLENEOL E100: 0.1%
Additive A: amount having the concentration (ppm) shown in Table 3
Ion exchange water: amount that makes the total of the components 100.0%

<Evaluation>

The prepared inks were evaluated as follows. In the present invention, in the evaluation criteria of the following respective evaluation items, "AA", "A" and "B" were taken as acceptable levels and "C" was taken as an unacceptable level. The evaluation results are shown in Table 3.

(Storage Stability)

The viscosity of each of the prepared inks was measured. In addition, the prepared ink was placed in a sealed vessel and stored in an oven at 80° C. for 4 days. Then, the temperature was returned to room temperature and then the viscosity of the ink was measured. The viscosity of the ink was measured using an E-type viscometer (trade name "RE80-L", manufactured by Toki Sangyo) that circulates an antifreeze solution in a constant temperature tank set at 25° C. through a tube with a rotor (1° 34'×R24) attached. The increase rate of the viscosity was calculated from the viscosity of the ink before and after storage and the storage stability of the ink was evaluated according to the evaluation criteria shown below.

AA: The increase rate of the viscosity was less than 1%.
A: The increase rate of the viscosity was 1% or more to less than 3%.
B: The increase rate of the viscosity was 3% or more to less than 5%.
C: The increase rate of the viscosity was 5% or more.

(Sticking Recovery Property)

An ink cartridge was filled with each of the prepared inks and mounted on a recording head of an ink jet recording apparatus (trade name "PIXUS MX7600", manufactured by Canon). Then, a nozzle check pattern was recorded on a recording medium (plain paper, trade name "PPC paper GF-500", manufactured by Canon) by operating the printer driver. Then, the recording head (head cartridge) on which the ink cartridge was mounted was removed from the ink jet recording apparatus and left in an environment at a temperature of 30° C. and a relative humidity of 10% for 7 days. The head cartridge after being left to stand was reattached to the ink jet recording apparatus and the nozzle check pattern was recorded. In a case where the nozzle check pattern was not normally recorded due to the occurrence of clogging, the nozzle check pattern was recorded again after cleaning by operating the printer driver. In a case where clogging occurred even at this point, the nozzle check pattern was recorded again after further performing strong cleaning after cleaning. In a case where clogging still occurred, strong cleaning and recording of the nozzle check pattern were repeated. Then, the number of times of strong cleaning required until the nozzle check pattern could be normally recorded was measured and the sticking recovery property was evaluated according to the evaluation criteria shown below.

A: The nozzle check pattern was normally recorded by two times of strong cleaning.
B: The nozzle check pattern was normally recorded by 3 times or more to 10 times or less of strong cleaning.
C: The nozzle check pattern was not recorded normally even after performing strong cleaning 11 times or more.

TABLE 3

Composition of ink and evaluation results

| | | | Composition of ink | | Evaluation results | |
|---|---|---|---|---|---|---|
| | | Resin | Coloring material | Amount of additive A (ppm) | Storage stability | Sticking recovery property |
| Example | 1 | 1 | Pigment dispersion liquid 1 | 20 | AA | A |
| | 2 | 1 | Pigment dispersion liquid 2 | 20 | AA | A |
| | 3 | 50 | Pigment dispersion liquid 3 | 20 | AA | A |
| | 4 | 1 | Pigment dispersion liquid 4 | 20 | AA | A |
| | 5 | 1 | C.I. Direct Blue 199 | 20 | AA | A |
| | 6 | 2 | Pigment dispersion liquid 1 | 20 | AA | A |
| | 7 | 3 | Pigment dispersion liquid 1 | 20 | A | A |
| | 8 | 4 | Pigment dispersion liquid 1 | 20 | AA | A |
| | 9 | 5 | Pigment dispersion liquid 1 | 20 | AA | A |
| | 10 | 6 | Pigment dispersion liquid 1 | 20 | AA | A |
| | 11 | 7 | Pigment dispersion liquid 1 | 20 | AA | A |
| | 12 | 8 | Pigment dispersion liquid 1 | 20 | AA | A |
| | 13 | 9 | Pigment dispersion liquid 1 | 20 | AA | A |
| | 14 | 10 | Pigment dispersion liquid 1 | 20 | AA | A |
| | 15 | 11 | Pigment dispersion liquid 1 | 20 | AA | A |

TABLE 3-continued

Composition of ink and evaluation results

| | | | | Composition of ink | | Evaluation results | |
|---|---|---|---|---|---|---|---|
| | | Resin | Coloring material | | Amount of additive A (ppm) | Storage stability | Sticking recovery property |
| | 16 | 12 | Pigment dispersion liquid 1 | | 20 | AA | A |
| | 17 | 13 | Pigment dispersion liquid 1 | | 20 | AA | A |
| | 18 | 14 | Pigment dispersion liquid 1 | | 20 | AA | A |
| | 19 | 15 | Pigment dispersion liquid 1 | | 20 | AA | A |
| | 20 | 16 | Pigment dispersion liquid 1 | | 20 | AA | A |
| | 21 | 17 | Pigment dispersion liquid 1 | | 20 | AA | A |
| | 22 | 18 | Pigment dispersion liquid 1 | | 20 | AA | A |
| | 23 | 19 | Pigment dispersion liquid 1 | | 20 | AA | A |
| | 24 | 20 | Pigment dispersion liquid 1 | | 20 | AA | A |
| | 25 | 21 | Pigment dispersion liquid 1 | | 20 | A | A |
| | 26 | 22 | Pigment dispersion liquid 1 | | 20 | B | A |
| | 27 | 23 | Pigment dispersion liquid 1 | | 20 | A | A |
| | 28 | 24 | Pigment dispersion liquid 1 | | 20 | A | A |
| | 29 | 25 | Pigment dispersion liquid 1 | | 20 | A | A |
| | 30 | 26 | Pigment dispersion liquid 1 | | 20 | A | A |
| | 31 | 27 | Pigment dispersion liquid 1 | | 20 | A | A |
| | 32 | 28 | Pigment dispersion liquid 1 | | 20 | A | A |
| | 33 | 29 | Pigment dispersion liquid 1 | | 20 | B | A |
| | 34 | 30 | Pigment dispersion liquid 1 | | 20 | AA | B |
| | 35 | 31 | Pigment dispersion liquid 1 | | 20 | AA | A |
| | 36 | 32 | Pigment dispersion liquid 1 | | 20 | AA | A |
| | 37 | 33 | Pigment dispersion liquid 1 | | 20 | AA | B |
| | 38 | 34 | Pigment dispersion liquid 1 | | 20 | A | A |
| | 39 | 35 | Pigment dispersion liquid 1 | | 20 | AA | A |
| | 40 | 36 | Pigment dispersion liquid 1 | | 20 | AA | A |
| | 41 | 37 | Pigment dispersion liquid 1 | | 20 | AA | B |
| | 42 | 38 | Pigment dispersion liquid 1 | | 20 | A | A |
| | 43 | 39 | Pigment dispersion liquid 1 | | 20 | AA | A |
| | 44 | 40 | Pigment dispersion liquid 1 | | 20 | AA | A |
| | 45 | 41 | Pigment dispersion liquid 1 | | 20 | A | A |
| | 46 | 1 | Pigment dispersion liquid 1 | | 0 | AA | B |
| | 47 | 1 | Pigment dispersion liquid 1 | | 5 | AA | B |
| | 48 | 1 | Pigment dispersion liquid 1 | | 10 | AA | A |
| | 49 | 1 | Pigment dispersion liquid 1 | | 1,000 | AA | A |
| | 50 | 1 | Pigment dispersion liquid 1 | | 1,100 | AA | B |
| | 51 | 29 | C.I. Direct Blue 199 | | 0 | B | B |
| Comparative Example | 1 | 42 | Pigment dispersion liquid 1 | | 20 | C | A |
| | 2 | 43 | Pigment dispersion liquid 1 | | 20 | C | A |
| | 3 | 44 | Pigment dispersion liquid 1 | | 20 | C | A |
| | 4 | 45 | Pigment dispersion liquid 1 | | 20 | C | A |
| | 5 | 46 | Pigment dispersion liquid 1 | | 20 | C | A |
| | 6 | 47 | Pigment dispersion liquid 1 | | 20 | C | A |
| | 7 | 49 | Pigment dispersion liquid 1 | | 20 | C | C |
| | 8 | 50 | Pigment dispersion liquid 1 | | 20 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-021971, filed Feb. 13, 2020, and Japanese Patent Application No. 2021-005006, filed Jan. 15, 2021, which are hereby incorporated by reference herein in their entirety.

What is claimed is:

1. An aqueous ink for ink jet comprising:
a coloring material; and
a block copolymer,
wherein the block copolymer includes an A block having a segment A having no acid group, and a group represented by Formula (1) bonded to one terminal of the segment A, and
a B block having a segment B having an acid group and a group represented by Formula (2) bonded to one terminal of the segment B,

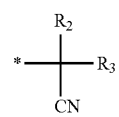

in Formula (1), * represents a bonding position to one terminal of the segment A, $R_1$ represents an alkylene group, and M represents a hydrogen atom, an alkali metal, ammonium or an organic ammonium; in Formula (2), * represents a bonding position to one terminal of the segment B, $R_2$ and $R_3$ each independently represent a hydrogen atom or an alkyl group, and $R_2$ and $R_3$ may be bonded to each other to form a ring structure.

2. The aqueous ink according to claim 1, wherein the group represented by Formula (1) is represented by Formula (1a) or (1b),

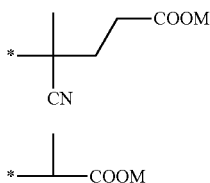

in Formulae (1a) and (1b), * represents a bonding position to one terminal of the segment A, and M represents a hydrogen atom, an alkali metal, ammonium or organic ammonium.

3. The aqueous ink according to claim 1, wherein the group represented by Formula (2) is represented by any one of Formulae (2a), (2b), (2c), (2d), (2e) and (2f),

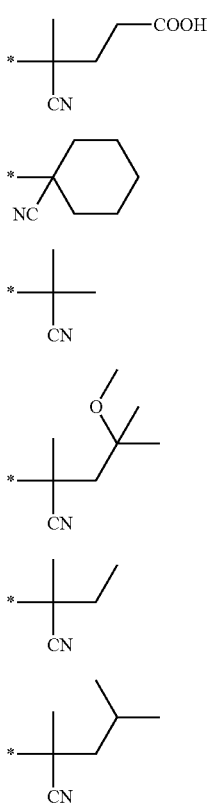

in Formulae (2a), (2b), (2c), (2d), (2e) and (2f), * represents a bonding position to one terminal of the segment B.

4. The aqueous ink according to claim 1, wherein the group represented by Formula (1) is represented by Formula (1a), the group represented by Formula (2) is represented by Formula (2f),

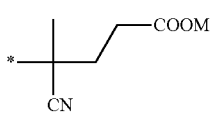

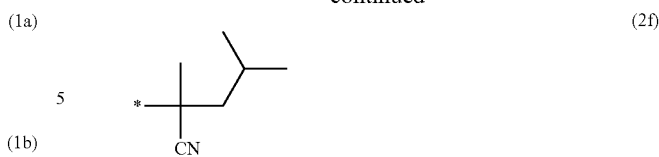

in Formula (1a), * represents a bonding position to one terminal of the segment A, and M represents a hydrogen atom, an alkali metal, ammonium or organic ammonium; in Formula (2f), * represents a bonding position to one terminal of the segment B.

5. The aqueous ink according to claim 1, wherein an acid value of the block copolymer is 100 mgKOH/g or more to 160 mgKOH/g or less.

6. The aqueous ink according to claim 1, wherein a number average molecular weight of the block copolymer is 5,000 or more to 20,000 or less.

7. The aqueous ink according to claim 1, wherein a ratio of a number average molecular weight of the B block to a number average molecular weight of the A block is 0.8 times or more to 1.2 times or less.

8. The aqueous ink according to claim 1, further comprising:
a compound represented by Formula (3), wherein a content of the compound represented by Formula (3) is 10 ppm or more to 1,000 ppm or less based on a total mass of the ink,

in Formula (3), Z represents an amino group, an alkyl group, an aryl group, an alkoxy group, an aryloxy group, an alkylthio group or an arylthio group, and $R_4$ represents a segment having an acid group.

9. The aqueous ink according to claim 1, wherein the coloring material contains a pigment.

10. An ink cartridge comprising:
an ink; and
an ink storage portion storing the ink,
wherein the ink comprises the aqueous ink according to claim 1.

11. An ink jet recording method comprising:
ejecting an ink from an ink jet recording head to record an image on a recording medium,
wherein the ink comprises the aqueous ink according to claim 1.

12. The aqueous ink according to claim 1, wherein the segment A comprises at least one unit derived from a monomer consisting of a monomer having an aromatic group and (meth)acrylate ester.

13. The aqueous ink according to claim 1, wherein the segment A comprises at least one unit derived from a monomer consisting of a monomer having an aromatic group.

14. The aqueous ink according to claim 1, wherein the segment B comprises at least one unit derived from a monomer consisting of (meth)acrylic acid, a monomer having an aromatic group, and (meth)acrylate ester.

15. The aqueous ink according to claim 1, wherein the segment B comprises an unit derived from (meth)acrylic acid and an unit derived from (meth)acrylate ester.

16. The aqueous ink according to claim 1, wherein the segment A comprises at least one unit derived from a monomer consisting of a monomer having an aromatic group and the segment B comprises an unit derived from (meth)acrylic acid and an unit derived from (meth)acrylate ester.

17. The aqueous ink according to claim 1, wherein the content (% by mass) of the coloring material in the ink is 0.1% by mass or more to 15.0% by mass or less based on the total mass of the ink.

18. The aqueous ink according to claim 1, wherein the content (% by mass) of the block copolymer in the ink is 0.1% by mass or more to 5.0% by mass or less based on the total mass of the ink.

19. The aqueous ink according to claim 8, wherein the content (mass%) of the compound represented by Formula (3) in the ink is 10 ppm or more to 100 ppm or less based on the total mass of the ink.

20. The aqueous ink according to claim 9, wherein the pigment is dispersed using a resin as a resin dispersant, and the resin dispersant is different from the block copolymer.

21. The aqueous ink according to claim 9, wherein the pigment comprises an organic pigment.

* * * * *